(12) United States Patent
Liu

(10) Patent No.: US 11,602,171 B2
(45) Date of Patent: Mar. 14, 2023

(54) ELECTRONIC CIGARETTE HAVING LEAKPROOF DEVICE FOR PREVENTING LEAKAGE OF E-LIQUID

(71) Applicant: Tuanfang Liu, Shenzhen (CN)

(72) Inventor: Tuanfang Liu, Shenzhen (CN)

(*) Notice: Subject to any disclaimer, the term of this patent is extended or adjusted under 35 U.S.C. 154(b) by 307 days.

(21) Appl. No.: 16/899,606

(22) Filed: Jun. 12, 2020

(65) Prior Publication Data
US 2021/0153550 A1    May 27, 2021

(30) Foreign Application Priority Data

Nov. 26, 2019  (CN) .......................... 201911170618.1
Nov. 26, 2019  (CN) .......................... 201922075269.7

(51) Int. Cl.
| | | |
|---|---|---|
| *A24F 13/00* | (2006.01) | |
| *A24F 17/00* | (2006.01) | |
| *A24F 25/00* | (2006.01) | |
| *A24F 40/42* | (2020.01) | |
| *A24F 40/10* | (2020.01) | |
| *F16J 15/06* | (2006.01) | |

(52) U.S. Cl.
CPC .............. *A24F 40/42* (2020.01); *A24F 40/10* (2020.01); *F16J 15/06* (2013.01)

(58) Field of Classification Search
CPC . A24F 40/10; A24F 40/40; A24F 40/42; F16J 15/06
See application file for complete search history.

(56) References Cited

U.S. PATENT DOCUMENTS

| | | | | |
|---|---|---|---|---|
| 10,405,582 | B2* | 9/2019 | Hatton | A24F 40/51 |
| 10,865,001 | B2* | 12/2020 | Atkins | A61M 15/06 |
| 11,071,328 | B2* | 7/2021 | Liu | A24F 7/02 |
| 11,089,821 | B2* | 8/2021 | Liu | A24F 40/40 |
| 2014/0007891 | A1* | 1/2014 | Liu | A24F 40/40 131/329 |
| 2017/0208870 | A1* | 7/2017 | Liu | A24F 40/485 |
| 2020/0113241 | A1* | 4/2020 | Liu | A24F 40/40 |
| 2021/0092998 | A1* | 4/2021 | Liu | A24F 40/10 |
| 2021/0153560 | A1* | 5/2021 | Liu | A24F 40/40 |
| 2021/0177058 | A1* | 6/2021 | Liu | A24F 40/46 |
| 2021/0195956 | A1* | 7/2021 | Han | A24F 40/485 |

FOREIGN PATENT DOCUMENTS

WO    WO-2016123780 A1 *   8/2016   ............. A24F 47/00

* cited by examiner

*Primary Examiner* — Abdullah A Riyami
*Assistant Examiner* — Thang H Nguyen
(74) *Attorney, Agent, or Firm* — Matthias Scholl P.C.; Matthias Scholl

(57) ABSTRACT

An electronic cigarette including an atomization assembly and a base assembly. The atomization assembly is disposed on the battery assembly. The atomization assembly includes an e-liquid tank; a first seal ring; a limit cover; a second seal ring; a piece of cotton; a heating wire; a third seal ring; a seal plug; a base; a joint; an insulation sleeve; and a connection sleeve. The battery assembly includes a pair of electrodes; a magnet; a fourth seal ring; an indicator light; a secondary support; a pneumatic switch; a silicone sleeve; a primary support; a battery; a USB plate; a housing. The piece of cotton wraps the heating wire. The piece of cotton and the heating wire are disposed on the base. The limit cover is disposed on the piece of cotton. The first seal ring and the second seal ring are disposed on two ends of the limit cover.

1 Claim, 6 Drawing Sheets

ELECTRONIC CIGARETTE HAVING LEAKPROOF DEVICE FOR PREVENTING LEAKAGE OF E-LIQUID

CROSS-REFERENCE TO RELATED APPLICATIONS

Pursuant to 35 U.S.C. § 119 and the Paris Convention Treaty, this application claims foreign priority to Chinese Patent Application No. 201911170618.1 filed Nov. 26, 2019 and to Chinese Patent Application No. 201922075269.7 filed Nov. 26, 2019. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure relates to an electronic cigarette.

Electronic cigarettes atomize nicotine-containing e-liquid.

Conventional electronic cigarettes have no leakproof device. The condensed e-liquid in the atomizer easily permeates into the battery assembly, leading to the short circuit.

SUMMARY

The disclosure provides an electronic cigarette comprising an atomization assembly and a base assembly. The atomization assembly is disposed on the battery assembly.

The atomization assembly comprises an e-liquid tank; a first seal ring; a limit cover; a second seal ring; a piece of cotton; a heating wire; a third seal ring; a seal plug; a base; a joint; an insulation sleeve; and a connection sleeve.

The battery assembly comprises a pair of electrodes; a magnet; a fourth seal ring; an indicator light; a secondary support; a pneumatic switch; a silicone sleeve; a primary support; a battery; a USB plate; a housing.

The piece of cotton wraps the heating wire; the piece of cotton and the heating wire are disposed on the base; the limit cover is disposed on the piece of cotton; the first seal ring and the second seal ring are disposed on two ends of the limit cover, respectively; the e-liquid tank is disposed on the base and the third seal ring encircles the base to seal the e-liquid tank; the joint is disposed on the insulation sleeve; the insulation sleeve is directly connected to the base; the connection sleeve is directly connected to the e-liquid tank.

The magnet and the pair of electrodes are disposed on the primary support to supply power for the atomization assembly; the pneumatic switch is disposed on the USB plate; the USB plate comprises positive and negative input terminals and positive and negative output terminals; the positive and negative input terminals are connected to the battery, and the positive and negative output terminals are connected to the pair of electrodes; the indicator light is disposed on the secondary support; the pneumatic switch is disposed on the secondary support; the secondary support is disposed in the silicone sleeve; the fourth seal ring is disposed on the primary support; the primary support is disposed on the housing; the primary support comprises an end face provided with a groove.

The piece of cotton is disposed on the base to absorb deposited e-liquid on the base. The limit cover is disposed on the piece of cotton to absorb condensed e-liquid on the limit cover. Thus, the limit cover, the cotton, the heating wire, and the base constitute a leakproof device, preventing the e-liquid from flowing into the battery. The primary support comprises an end face provided with a groove. The groove collects the condensed e-liquid of the atomization assembly, thus preventing the e-liquid from flowing into the battery assembly.

DETAILED DESCRIPTION

To further illustrate, embodiments detailing an electronic cigarette are described below. It should be noted that the following embodiments are intended to describe and not to limit the disclosure.

Figure 1:
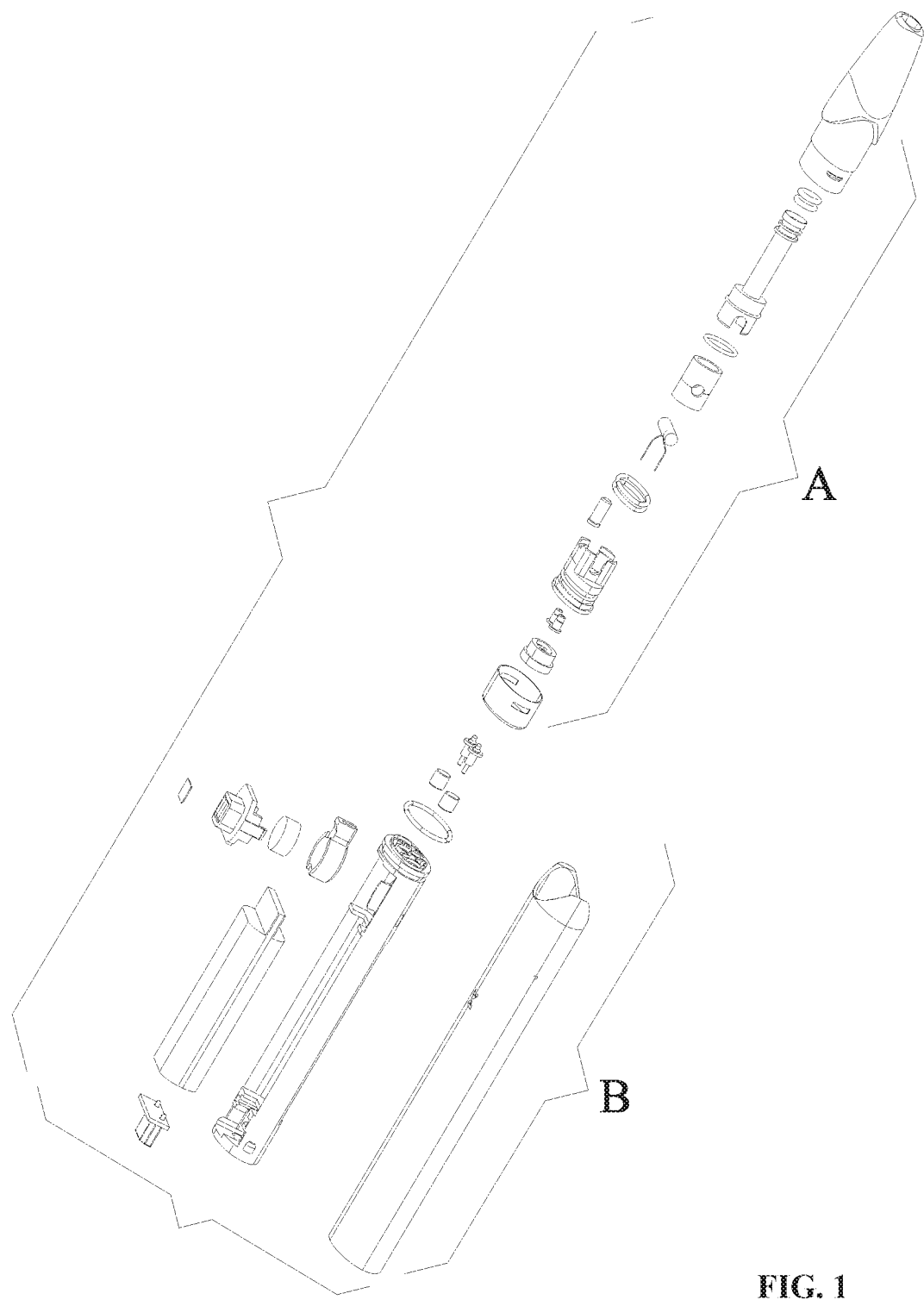
FIG. 1 is an exploded view of an electronic cigarette according to one embodiment of the disclosure.
Figure 2:
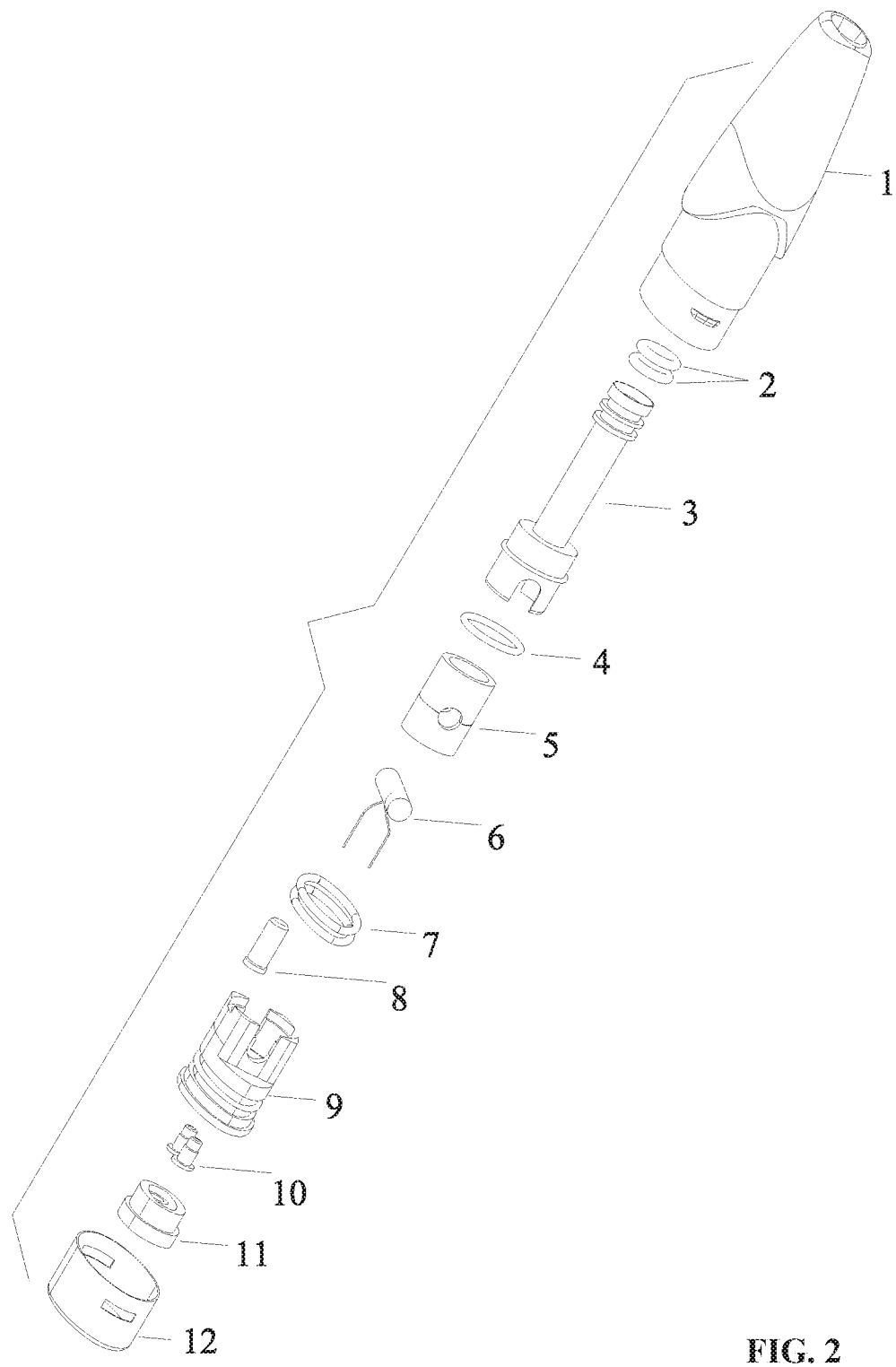
FIG. 2 is an exploded view of an atomization assembly of an electronic cigarette according to one embodiment of the disclosure.
Figure 3:
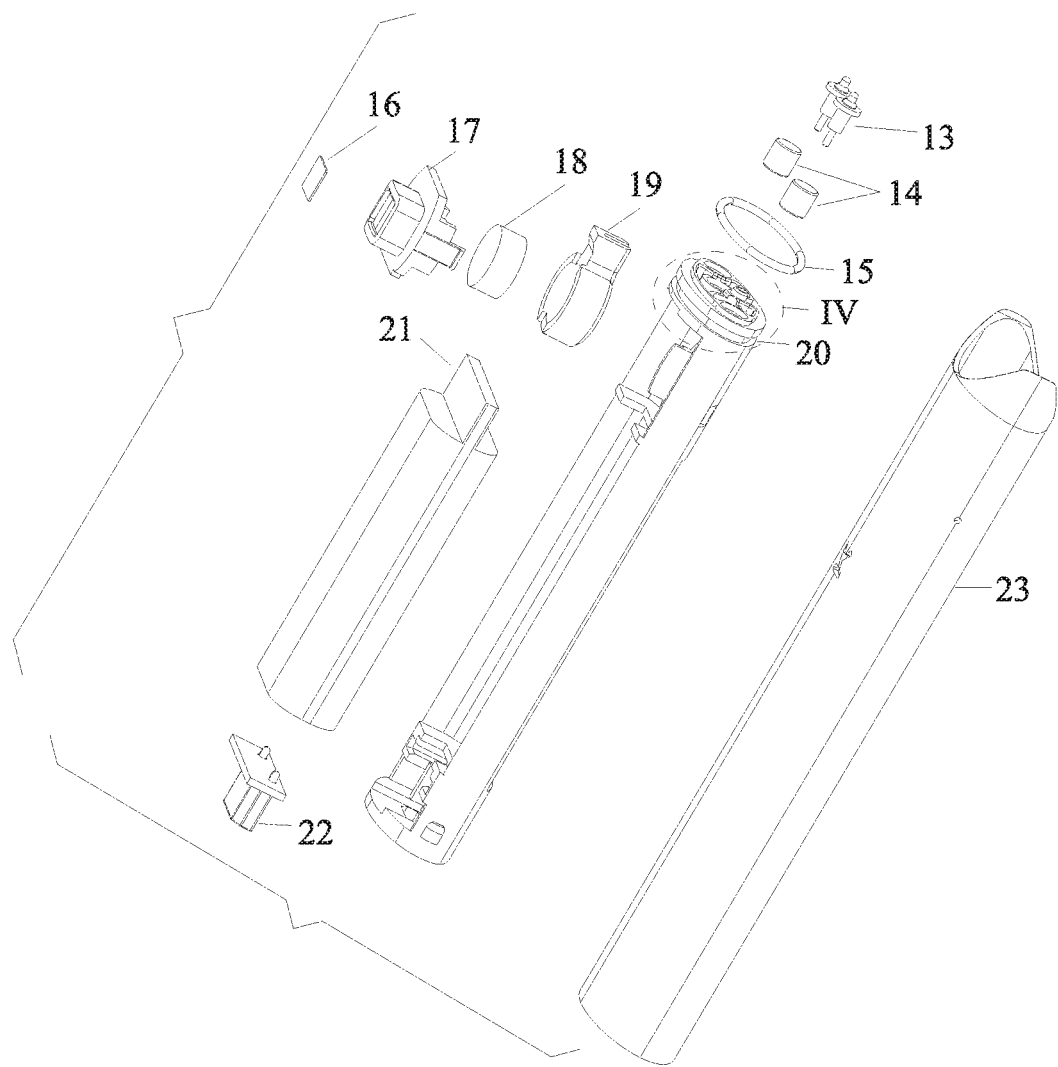
FIG. 3 is an exploded view of abase assembly of an electronic cigarette according to one embodiment of the disclosure.
Figure 4:
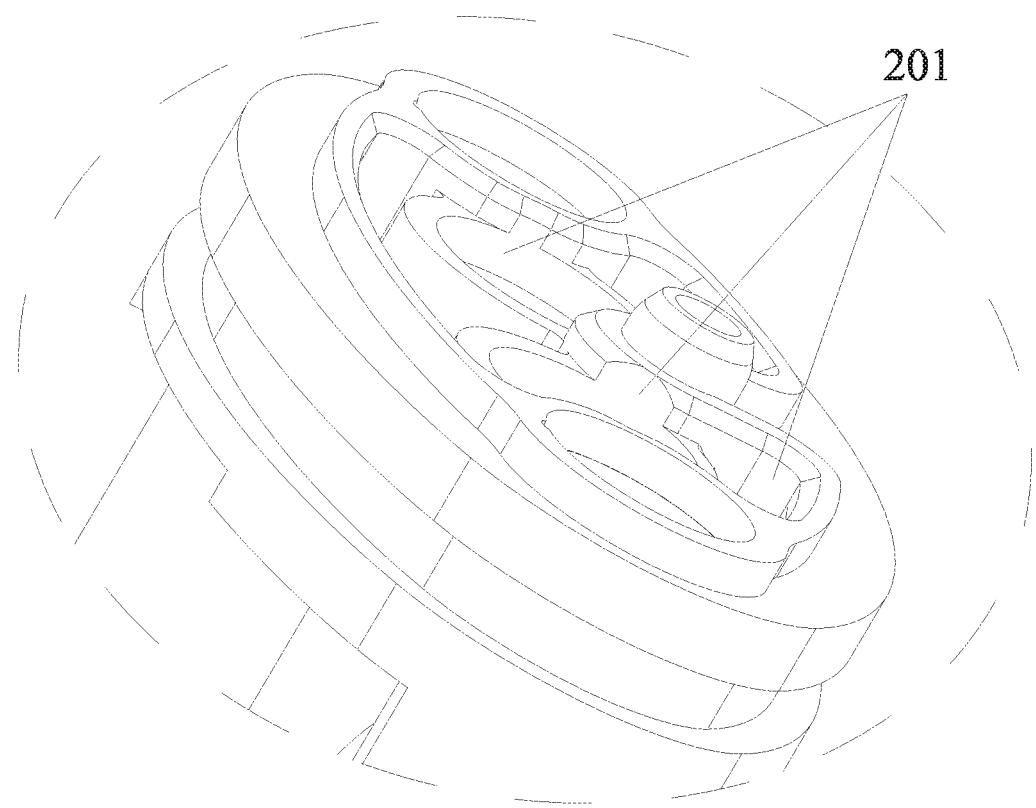
FIG. 4 is a local enlarged view of part IV in FIG. 3.
Figure 5:
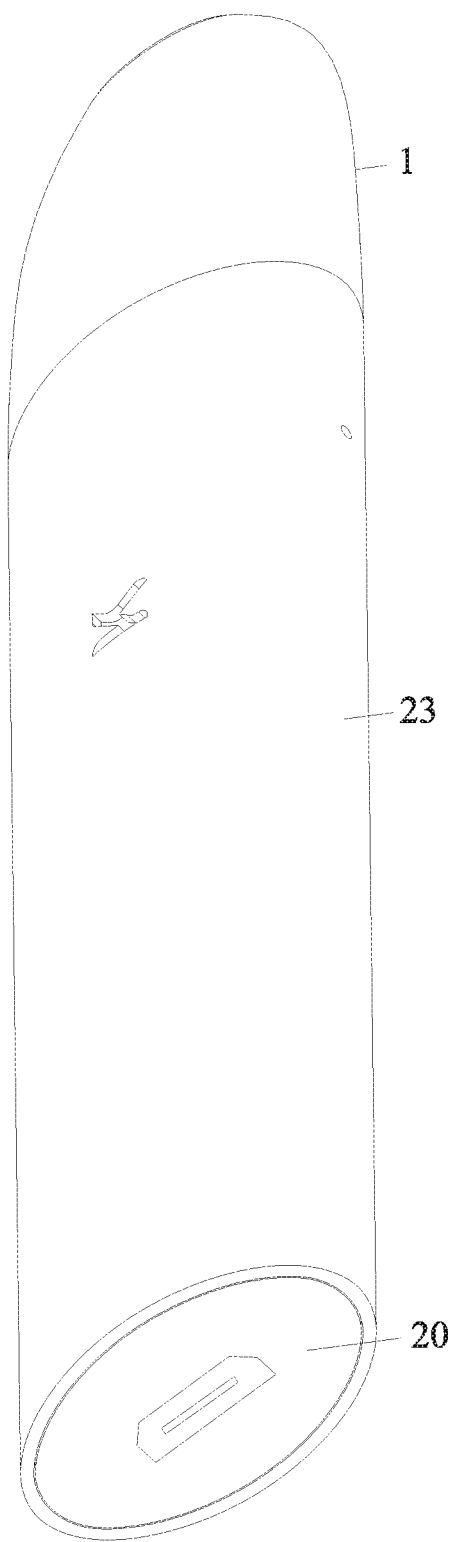
FIG. 5 is a front view of an electronic cigarette according to one embodiment of the disclosure.
Figure 6:
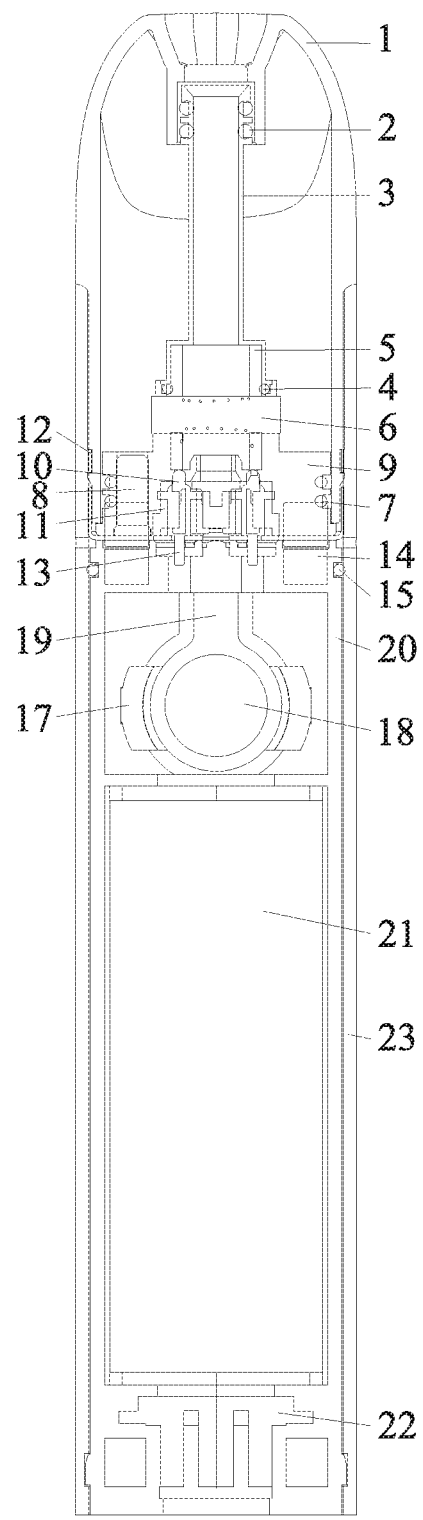
FIG. 6 is a sectional view of an electronic cigarette according to one embodiment of the disclosure.

As shown in FIGS. 1-6, an electronic cigarette comprises an atomization assembly A and a battery assembly B. The atomization assembly comprises: an e-liquid tank 1; a first seal ring 2; a limit cover 3; a second seal ring 4; a piece of cotton 5; a heating wire 6; a third seal ring 7; a seal plug 8; a base 9; a joint 10; an insulation sleeve 11; and a connection sleeve 12.

The battery assembly comprises a pair of electrodes 13; a magnet 14; a fourth seal ring 15; an indicator light 16; a secondary support 17; a pneumatic switch 18; a silicone sleeve 19; a primary support 20; a battery 21; a USB plate 22; a housing 23.

The piece of cotton 5 wraps the heating wire 6; the piece of cotton 5 and the heating wire 6 are disposed on the base 9; the limit cover 3 is disposed on the piece of cotton 5; the first seal ring 2 and the second seal ring 4 are disposed on two ends of the limit cover 3, respectively; the e-liquid tank 1 is disposed on the base 9 and the third seal ring 7 encircles the base 9 to seal the e-liquid tank 1; the joint 10 is disposed on the insulation sleeve 11; the insulation sleeve 11 is directly connected to the base 9; the connection sleeve 12 is directly connected to the e-liquid tank 1.

The piece of cotton 5 is disposed on the base to absorb deposited e-liquid on the base. The limit cover 3 is disposed on the piece of cotton 5 to absorb condensed e-liquid on the limit cover 3. Thus, the limit cover 3, the cotton 5, the heating wire 6, and the base 9 constitute a leakproof device, preventing the e-liquid from flowing into the battery.

The magnet 14 and the pair of electrodes 13 are disposed on the primary support 20 to supply power for the atomization assembly; the pneumatic switch 18 is disposed on the USB plate 22; the USB plate 22 comprises positive and negative input terminals and positive and negative output terminals, the positive and negative input terminals are connected to the battery 21, and the positive and negative output terminals are connected to the pair of electrodes 13; the indicator light 16 is disposed on the secondary support 17; the pneumatic switch 18 is disposed on the secondary support 17; the secondary support 17 is disposed in the silicone sleeve 19; the fourth seal ring 15 is disposed on the primary support 20; the primary support 20 is disposed on the housing 23; the primary support 20 comprises an end face provided with a groove 201. The groove 201 collects the condensed e-liquid of the atomization assembly A, thus preventing the e-liquid from flowing into the battery assembly.

It will be obvious to those skilled in the art that changes and modifications may be made, and therefore, the aim in the appended claims is to cover all such changes and modifications.

What is claimed is:

1. A device, comprising: an atomization assembly and a battery assembly; the atomization assembly being disposed on the battery assembly;

the atomization assembly comprising:
 1) An e-liquid tank;
 2) a first seal ring;
 3) a limit cover;
 4) a second seal ring;
 5) a piece of cotton;
 6) a heating wire;
 7) a third seal ring;
 8) a seal plug;
 9) a base;
 10) a joint;
 11) an insulation sleeve; and
 12) a connection sleeve;

the battery assembly comprising:
 13) a pair of electrodes;
 14) a magnet;
 15) a fourth seal ring;
 16) an indicator light;
 17) a secondary support;
 18) a pneumatic switch;
 19) a silicone sleeve;
 20) a primary support;
 21) a battery;
 22) a USB plate;
 23) a housing;

wherein:
 the piece of cotton wraps the heating wire; the piece of cotton and the heating wire are disposed on the base; the limit cover is disposed on the piece of cotton; the first seal ring and the second seal ring are disposed on two ends of the limit cover, respectively; the e-liquid tank is disposed on the base and the third seal ring encircles the base to seal the e-liquid tank; the joint is disposed on the insulation sleeve; the insulation sleeve is directly connected to the base; the connection sleeve is directly connected to the e-liquid tank; and the magnet and the pair of electrodes are disposed on the primary support to supply power for the atomization assembly; the pneumatic switch is disposed on the USB plate; the USB plate is connected to the battery and the pair of electrodes; the indicator light is disposed on the secondary support; the pneumatic switch is disposed on the secondary support; the secondary support is disposed in the silicone sleeve; the fourth seal ring is disposed on the primary support; the primary support is disposed on the housing; the primary support comprises an end face provided with a groove.

\* \* \* \* \*